US010009124B2

United States Patent
Yu et al.

(10) Patent No.: US 10,009,124 B2
(45) Date of Patent: Jun. 26, 2018

(54) METHODS AND APPARATUS FOR ANTENNA CALIBRATION

(71) Applicant: Telefonaktiebolaget LM Ericsson (publ), Stockholm (SE)

(72) Inventors: Shaowei Yu, Beijing (CN); Huaisong Zhu, Beijing (CN); Zhiyi Zong, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/555,598

(22) PCT Filed: Mar. 11, 2015

(86) PCT No.: PCT/CN2015/073996
§ 371 (c)(1),
(2) Date: Sep. 5, 2017

(87) PCT Pub. No.: WO2016/141566
PCT Pub. Date: Sep. 15, 2016

(65) Prior Publication Data
US 2018/0054264 A1    Feb. 22, 2018

(51) Int. Cl.
*H04B 17/00* (2015.01)
*H04B 17/14* (2015.01)
(Continued)

(52) U.S. Cl.
CPC .............. *H04B 17/14* (2015.01); *H01Q 3/267* (2013.01); *H04B 7/024* (2013.01); *H04B 7/04* (2013.01); *H04L 27/34* (2013.01); *H04W 88/08* (2013.01)

(58) Field of Classification Search
CPC .......... H04B 17/14; H04B 7/024; H04B 7/04; H04W 88/08
(Continued)

(56) References Cited

U.S. PATENT DOCUMENTS 6,654,590 B2 * 11/2003 Boros .................... H01Q 1/246
                                                          370/328
7,203,462 B2 *  4/2007 Kuwahara ............. H01Q 1/246
                                                          342/174
(Continued)

FOREIGN PATENT DOCUMENTS

CN          102149123 A       8/2011
CN          102404033 A       4/2012
(Continued)

*Primary Examiner* — April G Gonzales
(74) *Attorney, Agent, or Firm* — Murphy, Bilak & Homiller, PLLC

(57) ABSTRACT

The present disclosure provides a method and an apparatus in a radio base station for inter-transceiver antenna calibration. The method comprises collecting a first phase difference between a first signal and a first reception signal and a second phase difference between a second signal and a second reception signal. The first signal is transmitted through a reference transmission path of a first transceiver and received through a reference reception path of a second transceiver as the first reception signal. The second signal is transmitted through a reference transmission path of the second transceiver and received through a reference reception path of the first transceiver as the second reception signal. The method further comprises determining and compensating for an inter-loop phase response difference between a first reference path loop of the first transceiver and a second reference path loop of the second transceiver by subtracting the second phase difference from the first phase difference. The first reference path loop consists of the reference transmission path and the reference reception path of the first transceiver, and the second reference path loop consists of the reference transmission path and the reference reception path of the second transceiver.

12 Claims, 9 Drawing Sheets

(51) Int. Cl.
    *H04B 7/024*     (2017.01)
    *H01Q 3/26*     (2006.01)
    *H04L 27/34*     (2006.01)
    *H04W 88/08*     (2009.01)
    *H04B 7/04*     (2017.01)

(58) Field of Classification Search
    USPC .................................................. 455/67.14
    See application file for complete search history.

(56) References Cited

U.S. PATENT DOCUMENTS

| | | | | |
|---|---|---|---|---|
| 8,588,694 | B2* | 11/2013 | Goransson | H04B 7/0452 |
| | | | | 455/60 |
| 9,425,882 | B2* | 8/2016 | Harel | H04B 7/0871 |
| 9,497,781 | B2* | 11/2016 | Jeffery | H04W 74/0816 |
| 2001/0016505 | A1* | 8/2001 | Rexberg | H01Q 3/267 |
| | | | | 455/562.1 |
| 2009/0191819 | A1* | 7/2009 | Chae | H04B 17/00 |
| | | | | 455/67.14 |
| 2009/0310662 | A1* | 12/2009 | Kato | H04B 1/76 |
| | | | | 375/224 |
| 2010/0075594 | A1* | 3/2010 | Kim | H04L 25/0242 |
| | | | | 455/7 |
| 2010/0099362 | A1* | 4/2010 | Jongren | H04B 17/21 |
| | | | | 455/67.14 |
| 2010/0311457 | A1* | 12/2010 | Johansson | H01Q 1/005 |
| | | | | 455/517 |
| 2012/0020396 | A1* | 1/2012 | Hohne | H01Q 3/267 |
| | | | | 375/224 |
| 2012/0157007 | A1* | 6/2012 | Yoneyama | H04L 1/20 |
| | | | | 455/67.14 |
| 2012/0220331 | A1* | 8/2012 | Luo | H04B 17/14 |
| | | | | 455/517 |
| 2014/0273879 | A1* | 9/2014 | Coan | H04B 17/21 |
| | | | | 455/67.14 |

FOREIGN PATENT DOCUMENTS

| | | |
|---|---|---|
| CN | 102843173 A | 12/2012 |
| WO | 2011054144 A1 | 5/2011 |
| WO | 2012074446 A1 | 6/2012 |
| WO | 2013056398 A1 | 4/2013 |
| WO | 2015085510 A1 | 6/2015 |

* cited by examiner s930

s931

Determining, for each working path loop, a relative loop-back delay difference and a relative loop-back initial phase difference by:

for each subcarrier k, determining a frequency component of the relative loop-back phase response difference of the working path loop; and determining, based on the determined frequency components for the plurality of subcarriers, the relative loop-back delay difference and the relative loop-back initial phase difference of the working path loop s932

Compensating for an inconsistency among the relative delay differences of working path loops and an inconsistency among the relative initial phase differences of the working path loops

Fig. 10

METHODS AND APPARATUS FOR ANTENNA CALIBRATION

TECHNICAL FIELD

The present disclosure generally relates to the technical field of antenna calibration, and particularly, to a method and an apparatus in a Radio Base Station (RBS) for inter-transceiver antenna calibration and a method and an apparatus in an RBS for inner-transceiver antenna calibration.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Time Division Duplex (TDD) wireless systems, such as Time Division-Synchronous Code Division Multiple Access (TD-SCDMA) systems, Time Division-Long-term Evolution (TD-LTE) systems and TD-LTE Advanced (TD-LTE A) systems, the uplink/downlink channel reciprocity is exploited to estimate the downlink channel based on knowledge of the uplink channel.

However, in practical implementation, the uplink/downlink channel reciprocity may be not ideal due to a signal response characteristic difference between transmission and reception paths inside a transceiver. To ensure the reciprocity between uplink and downlink channels, it is necessary to determine and compensate for the signal response characteristic difference between the transmission and reception paths inside the transceiver.

In addition, within a multi-antenna transceiver comprising multiple pairs of transmission and reception paths corresponding to its multiple antennas, different transmission/reception paths, which consist of different Intermediate Frequency (IF) chains, different Radio Frequency (RF) chains and possibly different feeder cables, may exhibit different amplitude attenuation and phase shift characteristics. This in turn results in different reciprocity characteristics for different working path loops (that is, different pairs of transmission and reception paths have their respective signal response characteristic differences between transmission and reception paths). Accordingly, inner-transceiver antenna calibration has been introduced for the multi-antenna transceiver to compensate for the reciprocity characteristic inconsistency among the transceiver's different working path loops.

To improve cell throughput and cell-edge throughput effectively, the so-called Coordinated Multiple-Point (CoMP) transmission technology, which allows for mitigated co-channel interference and/or increased diversity gain by coordinating transmissions from more than one transceivers (for example, transceivers corresponding to sectors of the same RBS, or transceivers corresponding to sectors of different RBSs), has been introduced to LTE systems for downlink communications.

As a typical scheme of the CoMP transmission technology, the Coherent Joint Transmission (C-JT) scheme as illustrated in FIG. 1 enables a User Equipment (UE) to conduct a co-phase combination of transmitted signals from multiple transceivers by having the multiple transceivers perform joint pre-coding and beam-forming. As the C-JT scheme involves at least two antennas within different transceivers, there is a need to compensate for reciprocity characteristic inconsistency among different working path loops within different transceivers. To do this, inter-transceiver antenna calibration shall be applied.

For the inter-transceiver antenna calibration, WO20110544144A1 and CN102149123A propose a solution called node-assistant inter-transceiver antenna calibration, wherein a wireless-enabled assistant node (such as a relay, a micro station or a UE) is introduced for inter-transceiver antenna calibration as illustrated in FIG. 2. More specifically, an inter-transceiver antenna calibration process is divided into an inter-transceiver antenna reception calibration process, which compensates for signal response characteristic differences among reference reception paths of different transceivers, and an inter-transceiver antenna transmission calibration process, which compensates for signal response characteristic differences among reference transmission paths of different transceivers. In the case of inter-transceiver antenna reception calibration, transceivers involved in CoMP transmission receive a calibration signal from the assistant node and calibrate their reference reception paths according to a comparison between the calibration signal and its distorted versions received at the transceivers. In the case of inter-transceiver antenna transmission calibration, the assistant node receives orthogonal calibration signals from the transceivers, determines calibration parameters for calibrating the reference transmission paths of the transceivers according to a comparison between the orthogonal calibration signals and their distorted versions received by the assistant node, and feeds the calibration parameters respectively back to the transceivers.

Thus, without the assistant node, it is impossible to implement the node-assistant inter-transceiver antenna calibration among the transceivers involved in CoMP transmission. Moreover, as propagation paths between respective transceivers and the assistant node differ from each other, the distortions of the calibration signal by the propagation paths cannot be cancelled out for inter-transceiver antenna calibration, which is intended to compensate signal response characteristic differences among reference transmission/reception paths of different transceivers. As a result, the node-assistant inter-transceiver antenna calibration solution, which is based on the comparison between the calibration signal and its distorted versions received over the different propagation paths, inherently suffers from calibration inaccuracy.

In addition, to carry out the inter-transceiver antenna calibration, the node-assistant inter-transceiver antenna calibration solution requires one assistant node to be deployed for each CoMP set. For a typical radio network which may comprise hundreds or thousands of CoMP sets, efforts and costs incurred by deploying assistant nodes are considerable.

For the inter-transceiver antenna calibration, CN102843173A discloses another solution called transceiver-assistant inter-transceiver antenna calibration as illustrated in FIG. 3, wherein one of the transceivers involved in CoMP transmission is selected to work as the assistant node in the node-assistant inter-transceiver antenna calibration solution. However, as the underlining principle of the transceiver-assistant inter-transceiver antenna calibration is the same as that of the node-assistant inter-transceiver antenna calibration, the distortions of the calibration signal by propagation paths between the selected transceiver and respective transceivers other than the selected one cannot be cancelled out, either. Consequently, the calibration inaccuracy still exists. In addition, the transceiver-assistant inter-transceiver antenna calibration cannot be implemented in a scenario where it is impossible to find a third transceiver that can work as an assistant node for only two transceivers involved in CoMP transmission.

SUMMARY

In view of the foregoing, an object of the present disclosure is to overcome at least one of the drawbacks of the above-described inter-transceiver antenna calibration solutions.

To achieve this object, according to a first aspect of the present disclosure, there is provided a method in an RBS for inter-transceiver antenna calibration. The method comprises collecting a first phase difference between a first signal and a first reception signal and a second phase difference between a second signal and a second reception signal. The first signal is transmitted through a reference transmission path of a first transceiver and received through a reference reception path of a second transceiver as the first reception signal. The second signal is transmitted through a reference transmission path of the second transceiver and received through a reference reception path of the first transceiver as the second reception signal. The method further comprises determining and compensating for an inter-loop phase response difference between a first reference path loop of the first transceiver and a second reference path loop of the second transceiver by subtracting the second phase difference from the first phase difference. The first reference path loop consists of the reference transmission path and the reference reception path of the first transceiver. The second reference path loop consists of the reference transmission path and the reference reception path of the second transceiver.

According to a second aspect of the present disclosure, there is provided an apparatus in an RBS for inter-transceiver antenna calibration. The apparatus comprises a phase difference collecting section, an inter-loop phase response difference determining section and an inter-loop phase response difference compensating section. The phase difference collecting section is configured to collect a first phase difference between a first signal and a first reception signal and a second phase difference between a second signal and a second reception signal. The first signal is transmitted through a reference transmission path of a first transceiver and received through a reference reception path of a second transceiver as the first reception signal. The second signal is transmitted through a reference transmission path of the second transceiver and received through a reference reception path of the first transceiver as the second reception signal. The inter-loop phase response difference determining section is configured to determine an inter-loop phase response difference between a first reference path loop of the first transceiver and a second reference path loop of the second transceiver by subtracting the second phase difference from the first phase difference. The first reference path loop consists of the reference transmission path and the reference reception path of the first transceiver. The second reference path loop consists of the reference transmission path and the reference reception path of the second transceiver. The inter-loop phase response difference compensating section is configured to compensate for the inter-loop phase response difference.

Without involving a third party besides the first and second transceivers, the solutions according to the first and the second aspects of the disclosure are applicable to a scenario where antenna calibration is to be conducted between only two transceivers and the effort and cost for deploying an assistant node as a third party can be saved accordingly.

Meanwhile, the calibration inaccuracy, which is incurred by different propagation paths between respective transceivers and the assistant node or between the selected transceiver and receptive transceivers other than the selected one when the above-described node-assistant or transceiver-assistant inter-transceiver antenna calibration is applied, can be avoided, thereby allowing for accurate inter-transceiver antenna calibration.

Moreover, as compared with determining and compensating for the signal response characteristic difference between the first and second transceivers' reference reception paths and the signal response characteristic difference between the transceivers' reference transmission paths independently of each other, directly determining and compensating for the reciprocity characteristic inconsistency between the transceivers' reference working path loops reduces the computational complexity and time consumption for the inter-transceiver antenna calibration and meanwhile increases its accuracy.

As an additional object of the present disclosure, inner-transceiver antenna calibration is to be performed for compensating for reciprocity characteristic inconsistency among different working path loops inside a multi-antenna transceiver.

To achieve this object, according to a third aspect of the present disclosure, there is provided a method in an RBS for inner-transceiver antenna calibration. The RBS comprises a transceiver with pairs of transmission paths and reception paths. The method comprises collecting, for each of the transmission paths, a first phase difference between a first signal and a first reception signal and, for each of the reception paths, a second phase difference between a second signal and a second reception signal. The first signal is transmitted through each of the transmission paths and received through a calibration reception path of the transceiver as the first reception signal. The second signal is transmitted through a calibration transmission path of the transceiver and received through each of the reception paths as the second reception signal. Then, a relative loop-back phase response difference is determined, for each working path loop consisting of each of the pairs of transmission paths and reception paths, by subtracting the second phase difference from the first phase difference. The relative loop-back phase response difference is a loop-back phase response difference of the working path loop minus a loop-back phase response difference of a calibration path loop consisting of the calibration transmission path and the calibration reception path. Next, an inconsistency among the relative loop-back phase response differences of the working path loops is compensated for.

According to a fourth aspect of the present disclosure, there is provided an apparatus in an RBS for inner-transceiver antenna calibration. The RBS comprises a transceiver with pairs of transmission paths and reception paths. The apparatus comprises a phase difference collecting section, a relative loop-back phase response difference determining section and a loop-back phase response difference compensating section. The phase difference collecting section is configured to collect, for each of the transmission paths, a first phase difference between a first signal and a first reception signal and, for each of the reception paths, a second phase difference between a second signal and a second reception signal. The first signal is transmitted through each of the transmission paths and received through a calibration reception path of the transceiver as the first reception signal. The second signal is transmitted through a calibration transmission path of the transceiver and received through each of the reception paths as the second reception signal. The relative loop-back phase response difference determining section is configured to determine, for each working path loop consisting of each of the pairs of transmission paths and reception paths, a relative loop-back phase response difference by subtracting the second phase difference from the first phase difference. The relative loop-back phase response difference is a loop-back phase response difference of the working path loop minus a loop-back phase response difference of a calibration path loop consisting of the calibration transmission path and the calibration reception path. The loop-back phase response difference compensating section is configured to compensate for an inconsistency among the relative loop-back phase response differences of the working path loops.

According to a fifth aspect of the present disclosure, there is provided an RBS comprising a processor and a memory. The memory has machine-readable program code stored therein. When executed by the processor, the program code causes the RBS to perform the method according to the first aspect of the present disclosure.

According to a sixth aspect of the present disclosure, there is provided an RBS comprising a processor and a memory. The memory has machine-readable program code stored therein. When executed by the processor, the program code causes the RBS to perform the method according to the third aspect of the present disclosure.

BRIEF DESCRIPTION OF THE DRAWINGS

The above and other objects, features, and advantages of the present disclosure will become apparent from the following descriptions on embodiments of the present disclosure with reference to the drawings, in which:

FIGS. 9 and 10 are flowcharts illustrating operations of the inner-transceiver antenna calibration method according to the present disclosure.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, Application Specific Integrated Circuits (ASICs), Programmable Logical Arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 4:
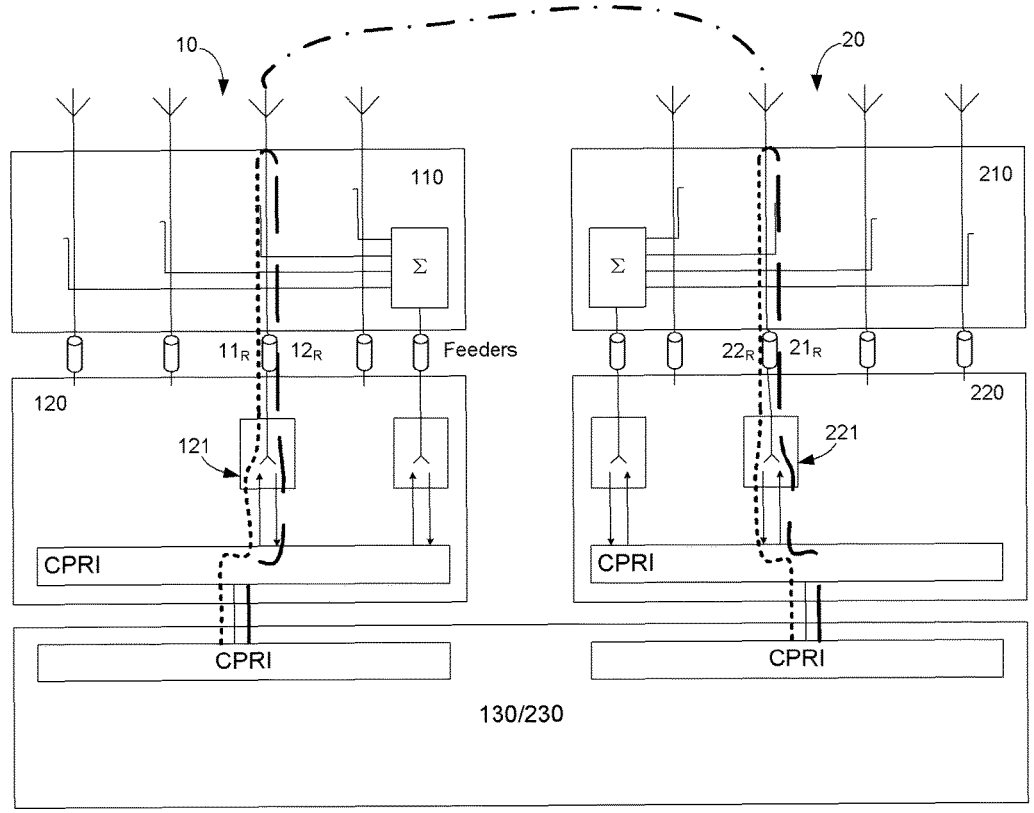
FIG. 4 is diagram schematically illustrating an arrangement of two transceivers that can be used with an inter-transceiver antenna calibration method according to the present disclosure.

To begin with, an arrangement of two transceivers 10 and 20 that can be used with an inter-transceiver antenna calibration method according to the present disclosure is illustrated in FIG. 4. The two transceivers 10 and 20 may be communicatively connected with each other via a wireless or wired connection (denoted in FIG. 4 as a dot-dash line) and may be provided in the same base station or in separate base stations, although in the Figure they are shown as wirelessly connected with each other and provided in the same base station.

Moreover, although each of transceivers 10 and 20 is illustrated as a multi-antenna transceiver, the proposed inter-transceiver antenna calibration method is also applicable to single-antenna transceivers as will be explained later.

As specifically illustrated in the left portion of FIG. 4, the transceiver 10 comprises an antenna array 110, a Radio Remote Unit (RRU) 120 and a Base Band Unit (BBU) 130. The antenna array 110 comprises four antenna elements as well as a combiner which is used for inner-transceiver antenna calibration to be described later. The RRU 120 comprises four pairs of transmission and reception chains each of which corresponds to one of the antenna elements, although only one pair of transmission and reception chains 121 is illustrated in FIG. 4 schematically. Also, the RRU 120 comprises a pair of calibration transmission and reception chains that corresponds to the combiner. In practical implementation, each pair of the transmission and reception chains consists of a band-pass filter, a power amplifier/low noise amplifier and a transceiving unit, which are not shown here for the sake of clarity and brevity. The antenna array 110 and the RRU 120 are connected with each other via feeder cables. The RRU 120 further comprises a Common Public Radio Interface (CPRI), which is connected with a CPRI in the BBU 130 via an optical fiber. As used here, a transmission/reception path of the transceiver 10 refers to a signal transmission/reception path in the transceiver, which consists of a feeder cable and a corresponding transmission/reception chain as well as the optical fiber. The structure of the transceiver 20 is substantially the same as that of the transceiver 10 and will not be described redundantly. In case the transceivers 10 and 20 correspond to sectors of the same RBS, they may share the same BBU which is denoted in FIG. 4 as 130/230. Otherwise, if the transceivers 10 and 20 correspond to sectors of different RBSs, they have separate BBUs 130 and 230.

In the following, an inter-transceiver antenna calibration method 500 according to the present disclosure will be described with respect to FIGS. 5 and 6.

Figure 5:
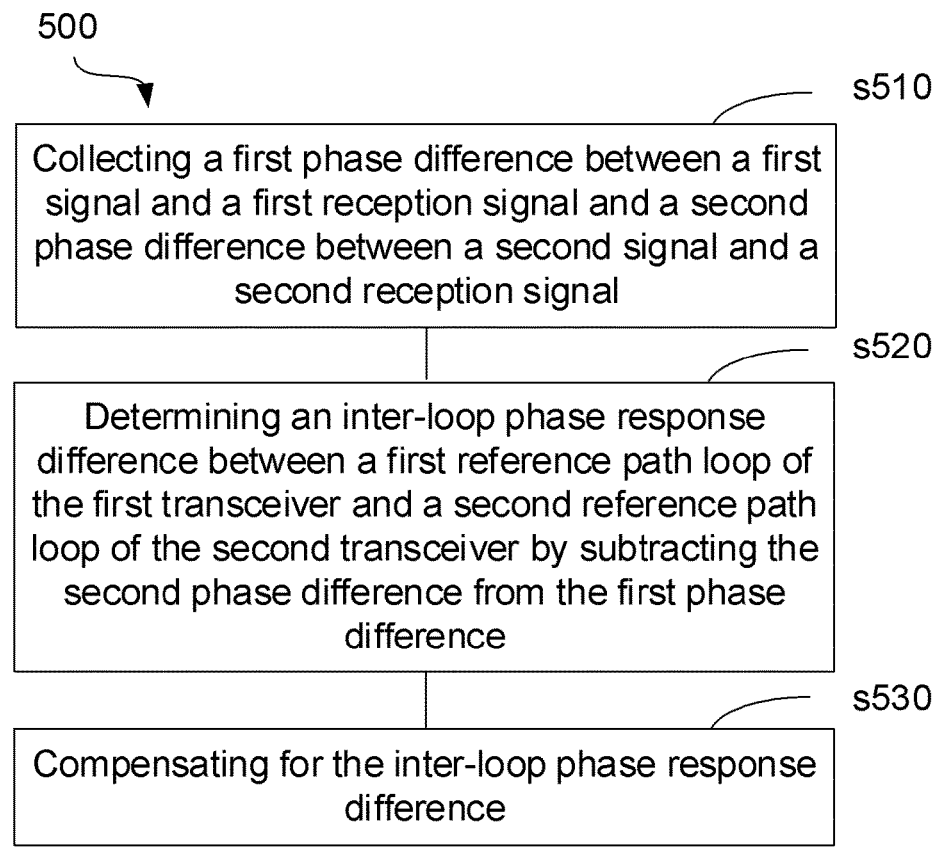
FIGS. 5 and 6 are flowcharts illustrating operations of the inter-transceiver antenna calibration method according to the present disclosure.

As illustrated in FIG. 5, the method 500 begins with block s510, where a first phase difference between a first signal $s_1$ and a first reception signal $Y_1$ and a second signal phase difference between a second signal $s_2$ and a second reception signal $Y_2$ are collected.

Referring back to FIG. 4, the first signal $s_1$ is transmitted through a reference transmission path $11_R$ of the first transceiver 10 (denoted as a dotted line in the first transceiver 10) and received through a reference reception path $22_R$ of the second transceiver 20 (denoted as a dotted line in the second transceiver 20) as the first reception signal $Y_1$. The second signal $s_2$ is transmitted through a reference transmission path $21_R$ of the second transceiver 20 (denoted as a dashed line in the second transceiver 20) and received through a reference reception path $12_R$ of the first transceiver 10 (denoted as a dashed line in the first transceiver 10) as the second reception signal $Y_2$. The reference transmission path $11_R$ may be selected as any one of the transmission paths in the first transceiver 10, and the reference reception path $12_R$ is one of the first transceiver 10's reception paths which is paired with the transmission path $11_R$. The reference transmission path $21_R$ may be selected as any one of the transmission paths in the second transceiver 20, and the reference reception path $22_R$ is one of the second transceiver 20's reception paths which is paired with the transmission path $21_R$.

Then, at block s520, an inter-loop phase response difference between a first reference path loop of the first transceiver 10 and a second reference path loop of the second transceiver 20 is determined by subtracting the second phase difference from the first phase difference. As also illustrated in FIG. 4, the first reference path loop consists of the reference transmission path $11_R$ and the reference reception path $12_R$ of the first transceiver 10. The second reference path loop consists of the reference transmission path $21_R$ and the reference reception path $22_R$ of the second transceiver 20.

Next, at block s530, the inter-loop phase response difference determined at block s520 is compensated for.

In the following, an explanation will be given mathematically in regard to why the inter-loop phase response difference between the first reference path loop of the first transceiver 10 and a second reference path loop of the second transceiver 20 can be derived by subtracting the second phase difference from the first phase difference.

First, let $c_{1,tx}*e^{j\theta_{1,tx}}$, $c_{2,rx}*e^{j\theta_{2,rx}}$, $c_{2,tx}*e^{j\theta_{2,tx}}$, $c_{1,rx}e^{j\theta_{1,rx}}$ and $c_{g12}*e^{j\theta_{g12}}$ respectively denote the signal response characteristics of the reference transmission path $11_R$ of the first transceiver 10, the reference reception path $22_R$ of the second transceiver 20, the reference transmission path $21_R$ of the second transceiver 20, the reference reception path $12_R$ of the first transceiver 10 and the propagation path between the first transceiver 10 and the second transceiver 20, with the symbol c and the symbol θ respectively denoting the amplitude response characteristic and the phase response characteristic of each path. Then, the first and the second reception signals $Y_1$ and $Y_2$ may be written as follows:

$$Y_1 = (c_{1,tx}*e^{j\theta_{1,tx}})*(c_{2,rx}*e^{j\theta_{2,rx}})*(c_g*e^{j\theta_{g12}})*s_1 + n_1 \quad (1\text{-}1)$$

$$Y_2 = (c_{2,tx}*e^{j\theta_{2,tx}})*(c_{1,rx}*e^{j\theta_{1,rx}})*(c_g*e^{j\theta_{g12}})*s_2 + n_2 \quad (1\text{-}2)$$

where $n_1$ and $n_2$ denote white noise in the reception signals $Y_1$ and $Y_2$ respectively.

With the white noise $n_1$ and $n_2$ ignored, the above formulas can be rewritten as follows:

$$Y_1/s_1 \approx A_1*e^{j\varphi_{12}} = c_{2,rx}*c_{1,tx}*c_{g12}*e^{j(\theta_{1,tx}+\theta_{2,rx}+\theta_{g12})} \quad (2\text{-}1)$$

$$Y_2/s_2 \approx A_2*e^{j\varphi_{21}} = c_{1,rx}*c_{2,tx}*c_{g12}*e^{j(\theta_{2,tx}+\theta_{1,rx}+\theta_{g12})} \quad (2\text{-}2)$$

where $\varphi_{12}$ and $\varphi_{21}$ respectively denote the first phase difference between the first signal $s_1$ and the first reception signal $Y_1$ and the second phase difference between the second signal $s_2$ and the second reception signal $Y_2$, and $A_1$ and $A_2$ respectively denote an amplitude ratio between the first signal $s_1$ and the first reception signal $Y_1$ and an amplitude ratio between the second signal $s_2$ and the second reception signal $Y_2$. Based on $s_1$, $Y_1$, $s_2$ and $Y_2$, $\varphi_{12}$, $\varphi_{21}$, $A_1$ and $A_2$ can be estimated according to any of appropriate estimation criteria, such as a Least Square (LS) error estimation criterion, a Minimum Mean Square Error (MMSE) criterion, or a zero-forcing criterion.

When considering only the phase relationships, we can get $$\theta_{1,tx}+\theta_{2,rx}+\theta_{g12}=\varphi_{12} \quad (3\text{-}1)$$

$$\theta_{1,rx}+\theta_{2,tx}+\theta_{g12}=\varphi_{21} \quad (3\text{-}2)$$

Subtracting formula (3-2) from formula (3-1) yields $$(\theta_{1,tx}-\theta_{1,rx})-(\theta_{2,tx}-\theta_{2,rx})=\varphi_{12}-\varphi_{21} \quad (4)$$

Denoting the loop-back phase response difference of the first reference path loop of the first transceiver 10 as $\theta_{1,loop}=\theta_{1,tx}-\theta_{1,rx}$ and the loop-back phase response difference of the second reference path loop of the second transceiver 20 as $\theta_{2,loop}=\theta_{2,tx}-\theta_{2,rx}$, formula (4) can be just written as $\theta_{1,loop}-\theta_{2,loop}=\varphi_{12}-\varphi_{21}$. Namely, the inter-loop phase response difference $\theta_{1,loop}-\theta_{2,loop}$ between the first reference path loop of the first transceiver 10 and the second reference path loop of the second transceiver 20 is determined by subtracting the second phase difference $\varphi_{21}$ from the first phase difference $\varphi_{12}$.

Besides the advantages set forth above in the summary section, the proposed method 500 allows for highly accurate inter-transceiver antenna calibration further because (1) it takes into account the delay on the optical fiber between the RRU and the BBU and (2) it is performed without using the combiners and the pairs of calibration transmission and reception chains in the transceivers.

In an embodiment, the first signal $s_1$ and the second signal $s_2$ may be transmitted on a plurality of subcarriers, which belong to a total number N of subcarriers used for wireless communications in a multi-carrier communications network (for example an Orthogonal Frequency Division Multiplex (OFDM) network).

Figure 6:
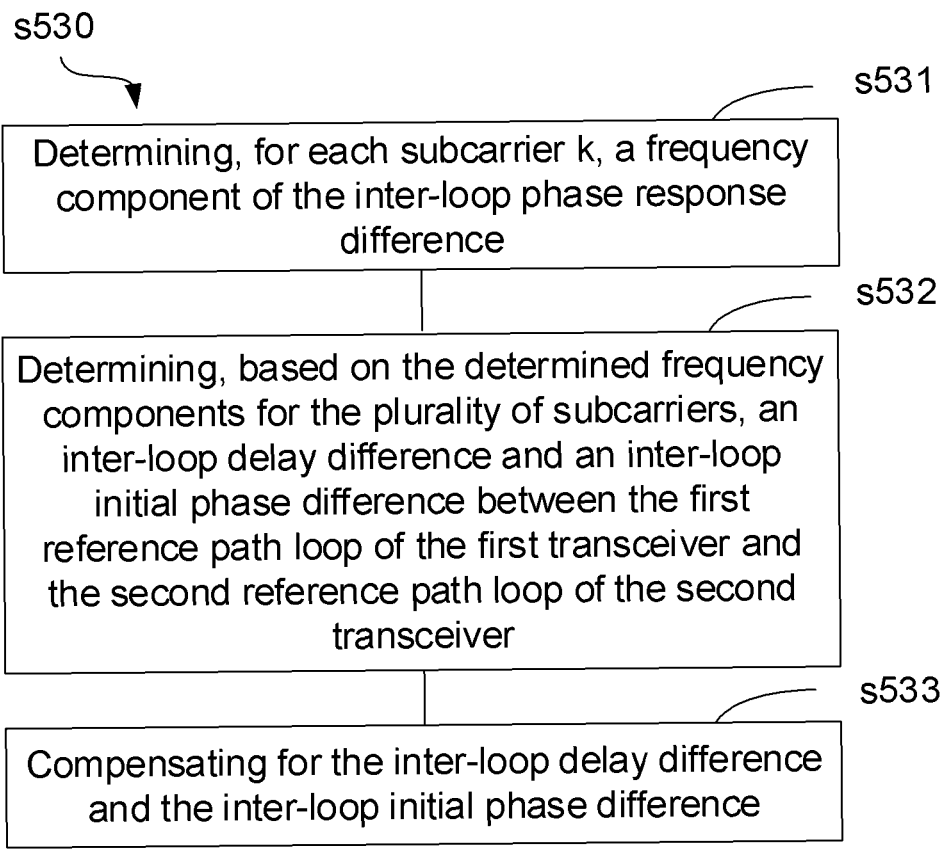

Then, the operation shown at block s530 in FIG. 5 may comprise operations shown at blocks s531-s533 in FIG. 6. At block s531, a frequency component $\varphi_k$ of the inter-loop phase response difference may be determined for each subcarrier k.

Supposing there is a linear relationship between the index of subcarrier k and the frequency component $\varphi_k$ of the inter-loop phase response difference for the respective subcarrier k (that is $$\varphi_k = \frac{2\pi}{N} \times k \times \Delta t_{est}/T_s + \varphi_{ini\_est} + n_k,$$

where $\Delta t_{est}$ is indicative of the slope of the linear relationship and denotes an inter-loop delay difference between the first reference path loop of the first transceiver 10 and the second reference path loop of the second transceiver 20, $\varphi_{ini\_est}$ is indicative of the initial value of the linear relationship and denotes an inter-loop initial phase difference between the first reference path loop of the first transceiver 10 and the second reference path loop of the second transceiver 20, $T_s$ denotes a duration of a modulated symbol and $n_k$ denotes white noise for subcarrier k), the inter-loop delay difference $\Delta t_{est}$ and the inter-loop initial phase difference $\varphi_{ini\_est}$ may be determined, based on the determined frequency components for the plurality of subcarriers.

By way of illustration rather than limitation, the inter-loop delay difference $\Delta t_{est}$ and the inter-loop initial phase difference $\varphi_{ini\_est}$ may be determined according to various polynomial fitting algorithms, such as standard least squares polynomial fitting, weighted least squares polynomial fitting, constrained least squares polynomial fitting, and robust least squares polynomial fitting.

As an example, according to the standard least squares polynomial fitting, the inter-loop delay difference $\Delta t_{est}$ and the inter-loop initial phase difference $\varphi_{ini\_est}$ may be determined respectively as $$\Delta t_{est} = \frac{L \cdot \sum_{k \in K}(k \cdot \varphi_k) - \sum_{k \in K}\varphi_k \cdot \sum_{k \in K} k}{L \cdot \sum_{k \in K} k^2 - \left(\sum_{k \in K} k\right)^2} * \frac{N}{2\pi},$$

$$\varphi_{ini\_est} = \frac{\sum_{k \in K}(k \cdot \varphi_k) \cdot \sum_{k \in K} k - \sum_{k \in K}\varphi_k \cdot \sum_{k \in K} k^2}{\left(\sum_{k \in K} k\right)^2 - L \cdot \sum_{k \in K} k^2},$$

where K denotes a subcarrier set consisting of the plurality of subcarriers on which the first and the second signals are transmitted, and L denotes a number of the plurality of subcarriers.

At block s533, the inter-loop delay difference $\Delta t_{est}$ and the inter-loop initial phase difference $\varphi_{ini\_est}$ between the first reference path loop of the first transceiver 10 and the second reference path loop of the second transceiver 20 may be compensated for.

In practical implementation, the inter-loop delay difference $\Delta t_{est}$ may be compensated for by intermediate frequency timing adjustment. The residual delay after the intermediate frequency timing adjustment and the inter-loop initial phase difference $\varphi_{ini\_est}$ may be compensated for at base band.

Correspondingly to the above-described method 500, an apparatus 700 in an RBS for inter-transceiver antenna calibration is provided.

Figure 7:
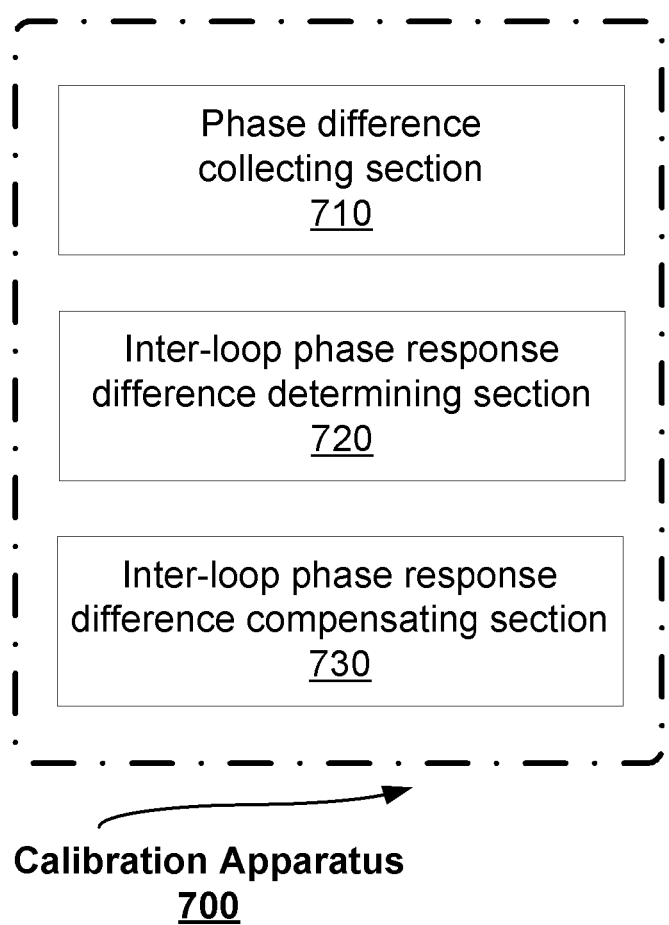
FIG. 7 is a block diagram illustrating an exemplary structure of an apparatus for inter-transceiver antenna calibration according to the present disclosure.

As illustrated in FIG. 7, the apparatus 700 comprises a phase difference collecting section 710, an inter-loop phase response difference determining section 720 and an inter-loop phase response difference compensating section 730. The phase difference collecting section 710 is configured to collect a phase difference between a first signal and a first reception signal and a second phase difference between a second signal and a second reception signal. The first signal is transmitted through a reference transmission path of a first transceiver and received through a reference reception path of a second transceiver as the first reception signal. The second signal is transmitted through a reference transmission path of the second transceiver and received through a reference reception path of the first transceiver as the second reception signal. The inter-loop phase response difference determining section 720 is configured to determine an inter-loop phase response difference between a first reference path loop of the first transceiver and a second reference path loop of the second transceiver by subtracting the second phase difference from the first phase difference. The first reference path loop consists of the reference transmission path and the reference reception path of the first transceiver. The second reference path loop consists of the reference transmission path and the reference reception path of the second transceiver. The inter-loop phase response difference compensating section is configured to compensate for the inter-loop phase response difference.

In an embodiment, the first signal and the second signal may be transmitted on a plurality of subcarriers. The inter-loop phase response difference compensating section 730 may be configured to determine, for each subcarrier, a frequency component of the inter-loop phase response difference, to determine, based on the determined frequency components for the plurality of subcarriers, an inter-loop delay difference and an inter-loop initial phase difference between the first reference path loop of the first transceiver and the second reference path loop of the second transceiver and to compensate for the inter-loop delay difference and the inter-loop initial phase difference.

In an embodiment, the inter-loop delay difference and the inter-loop initial phase difference may be determined according to one of the following polynomial fitting algorithms: standard least squares polynomial fitting, weighted least squares polynomial fitting, constrained least squares polynomial fitting and robust least squares polynomial fitting.

In an embodiment, according to the standard least squares polynomial fitting, the inter-loop delay difference may be determined as $$\Delta t_{est} = \frac{L \cdot \sum_{k \in K}(k \cdot \varphi_k) - \sum_{k \in K}\varphi_k \cdot \sum_{k \in K}k}{L \cdot \sum_{k \in K}k^2 - \left(\sum_{k \in K}k\right)^2} * \frac{N}{2\pi},$$

where K denotes a subcarrier set consisting of the plurality of subcarriers on which the first and the second signals are transmitted, L denotes a number of the plurality of subcarriers and N denotes a total number of subcarriers used by the RBS for wireless communications.

In an embodiment, according to the standard least squares polynomial fitting, the inter-loop initial phase difference may be determined as $$\varphi_{ini\_est} = \frac{\sum_{k \in K}(k \cdot \varphi_k) \cdot \sum_{k \in K}k - \sum_{k \in K}\varphi_k \cdot \sum_{k \in K}k^2}{\left(\sum_{k \in K}k\right)^2 - L \cdot \sum_{k \in K}k^2},$$

where K denotes a subcarrier set consisting of the plurality of subcarriers on which the first and the second signals are transmitted, L denotes a number of the plurality of subcarriers and N denotes a total number of subcarriers used by the RBS for wireless communications.

As those skilled in the art will appreciate, the above-described sections may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the RBS where the apparatus for inter-transceiver antenna calibration is implemented comprises a memory and a processor (including but not limited to a microprocessor, a microcontroller or a Digital Signal Processor (DSP), etc.) The memory stores machine-readable program code executable by the processor. The processor, when executing the machine-readable program code, performs the functions of the above-described sections 710-730.

In addition to the above-described inter-transceiver antenna calibration method 500, the present disclosure also provides an inner-transceiver antenna calibration method, which enables the reciprocity characteristic inconsistency among different working path loops of a multi-antenna transceiver to be compensated for.

Figure 1:
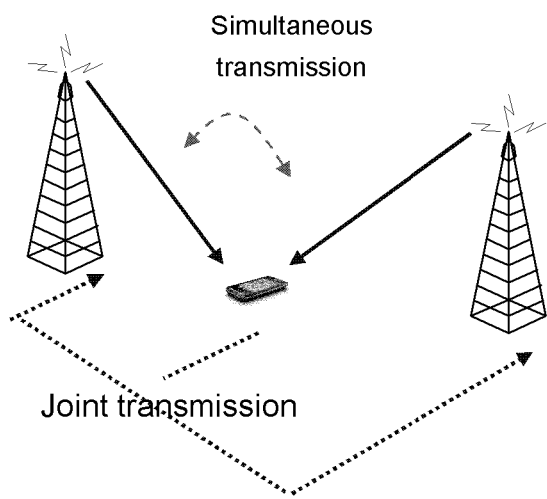
FIG. 1 is a diagram illustrating an example scenario where two base station transceivers perform joint transmission to a UE.
Figure 2:
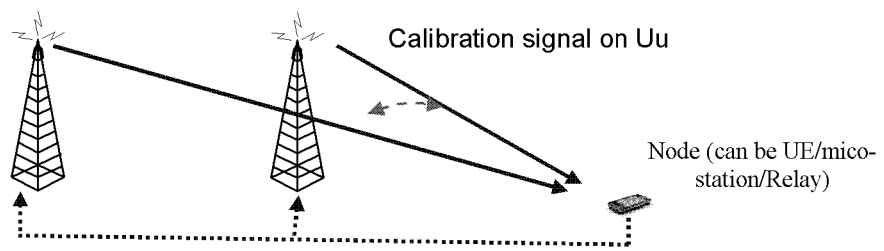
FIG. 2 is a diagram illustrating a node-assistant inter-transceiver antenna calibration solution according to the prior art.
Figure 3:
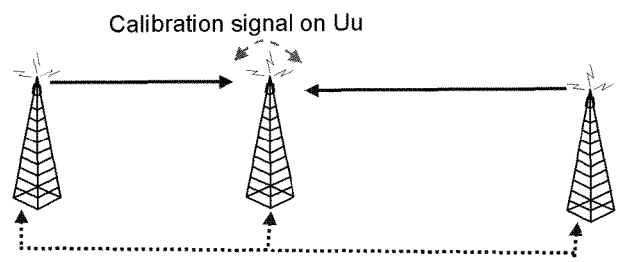
FIG. 3 is a diagram illustrating a transceiver-assistant inter-transceiver antenna calibration solution according to the prior art.
Figure 8:
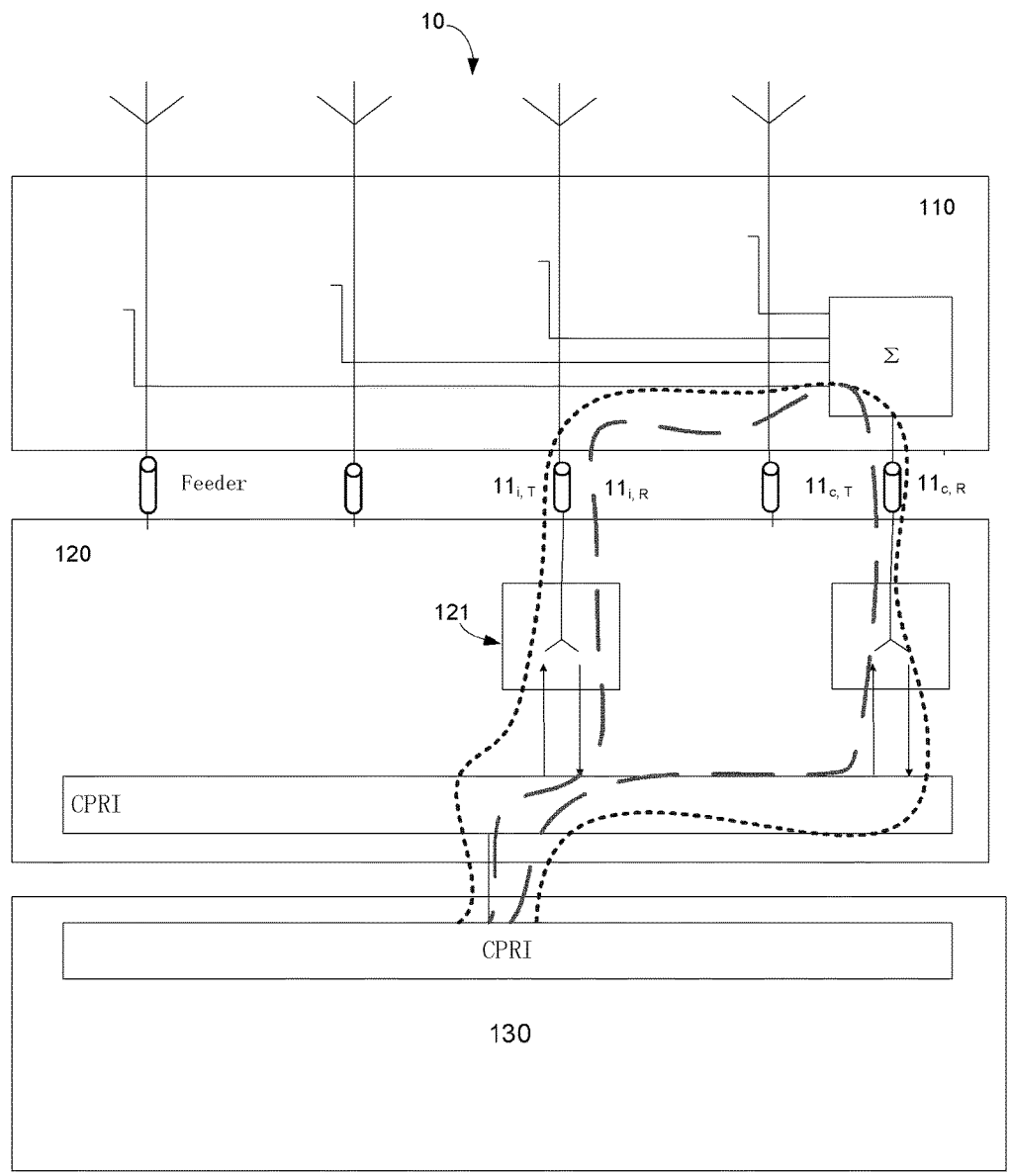
FIG. 8 is a diagram schematically illustrating an arrangement of a multi-antenna transceiver that can be used with an inner-transceiver antenna calibration method according to the present disclosure.

As illustrated in FIG. 8, the structure of the transceiver that can be used with the inner-transceiver antenna calibration method according to the present disclosure is substantially the same as that of the transceiver 10 illustrated in FIG. 1 and will not be described redundantly. To facilitate description, respective pairs of transmission and reception paths corresponding to the respective antenna elements are assigned with respective pairs of symbols $11_{i,T}$ and $11_{i,R}$ (i=1, 2, 3, 4), the calibration transmission and reception paths are assigned with symbols $11_{c,T}$ and $11_{c,R}$, and the working path loop consisting of the transmission path $11_{i,T}$ and the reception path $11_{i,R}$ is denoted as $11_{i,T-R}$.

In the following, an inner-transceiver antenna calibration method 900 according to the present disclosure will be described with respect to FIGS. 9 and 10.

Figure 9:
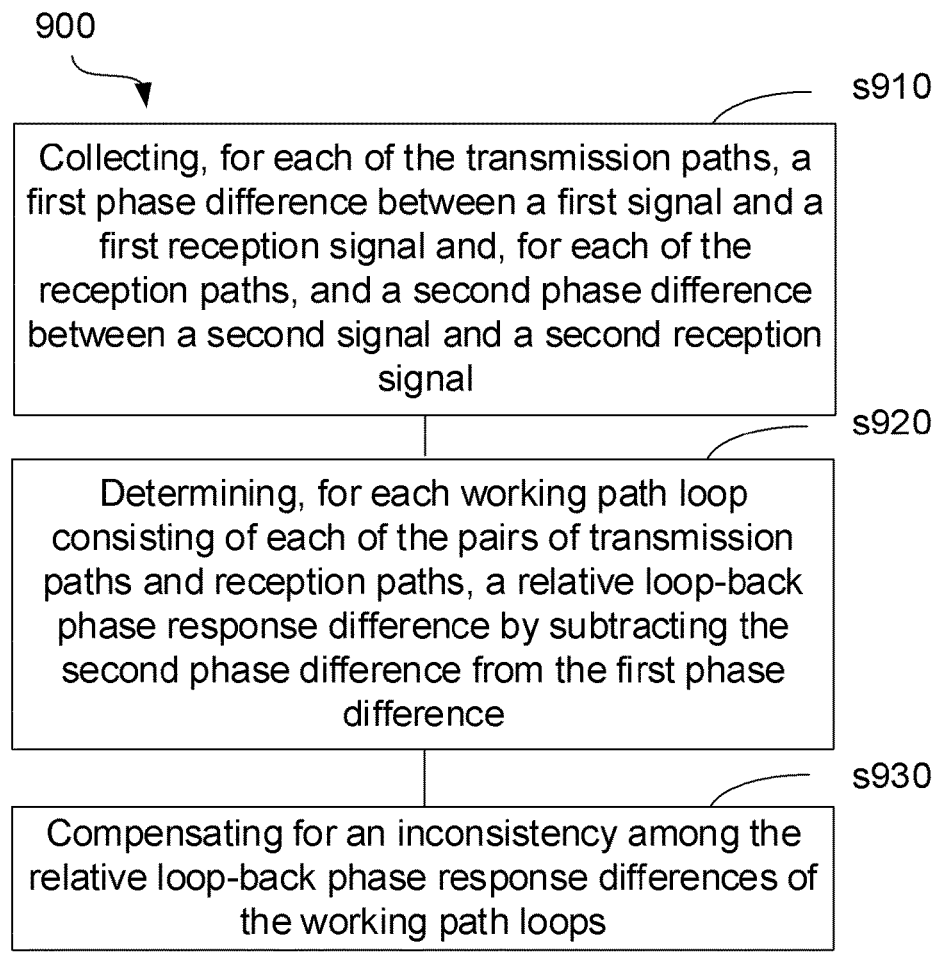

As shown in FIG. 9, the method 900 begins with block s910. At this block, a first phase difference between a first signal $s_1$ and a first reception signal $Y_1$ is collected for each of the transmission paths $11_{i,T}$, and a second phase difference between a second signal $s_2$ and a second reception signal $Y_2$ is collected for each of the reception paths $11_{i,R}$.

Referring back to FIG. 8, the first signal $s_1$ is transmitted through each of the transmission paths $11_{i,T}$ and received through a calibration reception path $11_{c,R}$ of the transceiver 10 as the first reception signal $Y_1$, along the dotted line. The second signal $s_2$ is transmitted through a calibration transmission path $11_{c,T}$ of the transceiver 10 and received through each of the reception paths $11_{i,R}$ as the second reception signal $Y_2$, along the dashed line.

Then, at block s920, a relative loop-back phase response difference is determined for each working path loop $11_{i,T-R}$ consisting of each of the pairs of transmission paths $11_{i,T}$ and reception paths $11_{i,R}$, by subtracting the second phase difference from the first phase difference. The relative loop-back phase response difference is a loop-back phase response difference of the working path loop minus a loop-back phase response difference of the calibration path loop consisting of the calibration transmission path $11_{c,T}$ and the calibration reception path $11_{c,R}$.

Next, at block s930, an inconsistency among the relative loop-back phase response differences of the working path loops is compensated for.

Below, an explanation will be given mathematically in regard to why the relative loop-back phase response difference for each working path loop can be derived by subtracting the second phase difference from the first phase difference.

First, let $c_{i,tx}*e^{j\theta_{i,tx}}$, $c_{i,rx}*e^{j\theta_{i,rx}}$, $c_{cal,tx}*e^{j\theta_{cal,tx}}$ and $c_{cal,rx}*e^{j\varphi_{cal,rx}}$ respectively denote the signal response characteristics of the transmission path $11_{i,T}$, the reception path $11_{i,R}$, the calibration transmission path $11_{c,T}$ and the calibration reception path $11_{c,R}$, with the symbol c and the symbol $\theta$ respectively denoting the amplitude response characteristic and the phase response characteristic of each path. Then, the first and the second reception signals $Y_1$ and $Y_2$ may be written as follows:

$$Y_1 = (c_{i,tx}*e^{j\theta_{i,tx}})*(c_{cal,rx}*e^{j\theta_{cal,rx}})*s_1 + n_1 \quad (5\text{-}1)$$

$$Y_2 = (c_{i,rx}*e^{j\theta_{i,rx}})*(c_{cal,tx}*e^{j\theta_{cal,tx}})*s_2 + n_2 \quad (5\text{-}2)$$

where $n_1$ and $n_2$ denote white noise in the reception signals $Y_1$ and $Y_2$ respectively.

With the white noise $n_1$ and $n_2$ ignored, the above formulas can be rewritten as follows:

$$Y_1/s_1 \approx A_1 * e^{j\varphi_{i,R}} = c_{i,tx}*c_{cal,rx}*e^{j(\theta_{i,tx}+\theta_{cal,rx})} \quad (6\text{-}1)$$

$$Y_2/s_2 \approx A_2 * e^{j\varphi_{i,T}} = c_{i,rx}*c_{cal,tx}*e^{j(\theta_{cal,tx}+\theta_{i,rx})} \quad (6\text{-}2)$$

where $\varphi_{i,R}$ and $\varphi_{i,T}$ respectively denote the first phase difference between the first signal $s_1$ and the first reception signal $Y_1$ and the second phase difference between the second signal $s_2$ and the second reception signal $Y_2$, and $A_1$ and $A_2$ respectively denote an amplitude ratio between the first signal $s_1$ and the first reception signal $Y_1$ and an amplitude ratio between the second signal $s_2$ and the second reception signal $Y_2$. Based on $s_1$, $Y_1$, $s_2$ and $Y_2$, $\varphi_{i,R}$, $\varphi_{i,T}$, $A_1$ and $A_2$ can be estimated according to any of appropriate estimation criteria, such as a Least Square (LS) error estimation criterion, a Minimum Mean Square Error (MMSE) criterion, or a zero-forcing criterion.

When considering only the phase relationships, we can get $$\theta_{i,tx} + \theta_{cal,rx} = \varphi_{i,R} \quad (7\text{-}1)$$

$$\theta_{i,rx} + \theta_{cal,tx} = \varphi_{i,T} \quad (7\text{-}2)$$

Subtracting formula (7-2) from formula (7-1) yields $$(\varphi_{i,tx}-\theta_{i,rx})-(\theta_{cal,tx}-\theta_{cal,rx})=\varphi_{i,R}-\varphi_{i,T} \quad (8)$$

where $(\varphi_{i,tx}-\theta_{i,rx})$ denotes the loop-back phase response difference of the working path loop consisting of the transmission path $11_{i,T}$ and the reception path $11_{i,R}$, $(\theta_{cal,tx}-\theta_{cal,rx})$ denotes the loop-back phase response difference of the calibration path loop consisting of the calibration transmission path $11_{c,T}$ and the calibration reception path $11_{c,R}$, and $(\theta_{i,tx}-\theta_{i,rx})-(\theta_{cal,tx}-\theta_{cal,rx})$ denotes the relative loop-back phase response difference.

As in the inter-transceiver antenna calibration method 500 described above, the first signal $s_1$ and the second signal $s_2$ may be transmitted on a plurality of subcarriers, which belong to a total number N of subcarriers used for wireless communications in a multi-carrier communications network.

Then, the operation shown at block s930 in FIG. 9 may comprise operations shown at blocks s931 and s932 in FIG. 10. At block s931, a relative loop-back delay difference and a relative loop-back initial phase difference may be determined for each working path loop $11_{i,T-R}$. Specifically, this can be done by determining, for each subcarrier k, a frequency component $\varphi_{i,k}$ of the relative loop-back phase response difference of the working path loop ($11_{i,T-R}$) and determining, based on the determined frequency components for the plurality of subcarriers, the relative loop-back delay difference and the relative loop-back initial phase difference of the working path loop ($11_{i,T-R}$).

Supposing there is a linear relationship between the index of subcarrier k and the frequency component $\varphi_{i,k}$ of the relative loop-back phase response difference of the working path loop $11_{i,T-R}$ for the respective subcarrier k (that is $$\varphi_{i,k} = \frac{2\pi}{N} \times k \times \Delta t_{i,est}/T_s + \varphi_{i,ini\_est} + n_k,$$

where $\Delta t_{i,est}$ is indicative of the slope of the linear relationship and denotes an relative loop-back delay difference of the working path loop $11_{i,T-R}$, $\varphi_{i,ini\_est}$ is indicative of the initial value of the linear relationship and denotes a relative loop-back initial phase difference of the working path loop $11_{i,T-R}$, $T_s$ denotes a duration of a modulated symbol and $n_k$ denotes white noise for subcarrier k), the relative loop-back delay difference $\Delta t_{est}$ and the relative loop-back initial phase difference $\varphi_{i,ini\_est}$ may be determined, based on the determined frequency components for the plurality of subcarriers.

Also, as already set forth above with respect to the inter-transceiver antenna calibration method 500, $\Delta t_{i,est}$ and $\varphi_{i,ini\_est}$ may be determined according to various polynomial fitting algorithms. In case the standard least squares polynomial fitting algorithm is applied, $\Delta t_{i,est}$ and $\varphi_{i,ini\_est}$ may be determined respectively as $$\Delta t_{i,est} = \frac{L \cdot \sum_{k \in K}(k \cdot \varphi_{i,k}) - \sum_{k \in K}\varphi_{i,k} \cdot \sum_{k \in K}k}{L \cdot \sum_{k \in K}k^2 - \left(\sum_{k \in K}k\right)^2} * \frac{N}{2\pi},$$

$$\varphi_{i,ini\_est} = \frac{\sum_{k \in K}(k \cdot \varphi_{i,k}) \cdot \sum_{k \in K}k - \sum_{k \in K}\varphi_{i,k} \cdot \sum_{k \in K}k^2}{\left(\sum_{k \in K}k\right)^2 - L \cdot \sum_{k \in K}k^2},$$

where K denotes a subcarrier set consisting of the plurality of subcarriers on which the first and the second signals are transmitted, and L denotes a number of the plurality of subcarriers.

At block s932, an inconsistency among the relative loop-back delay differences of the working path loops and an inconsistency among the relative loop-back initial phase differences of the working path loops may be compensated for.

In practical implementation, the inconsistency among the relative loop-back delay difference may be compensated for by intermediate frequency timing adjustment. The residual delay after the intermediate frequency timing adjustment and the inconsistency among the relative loop-back initial phase difference may be compensated for at base band.

Correspondingly to the above-described method 900, an apparatus 1100 in an RBS for inner-transceiver antenna calibration is provided. The RBS comprises a transceiver with pairs of transmission paths and reception paths.

Figure 11:
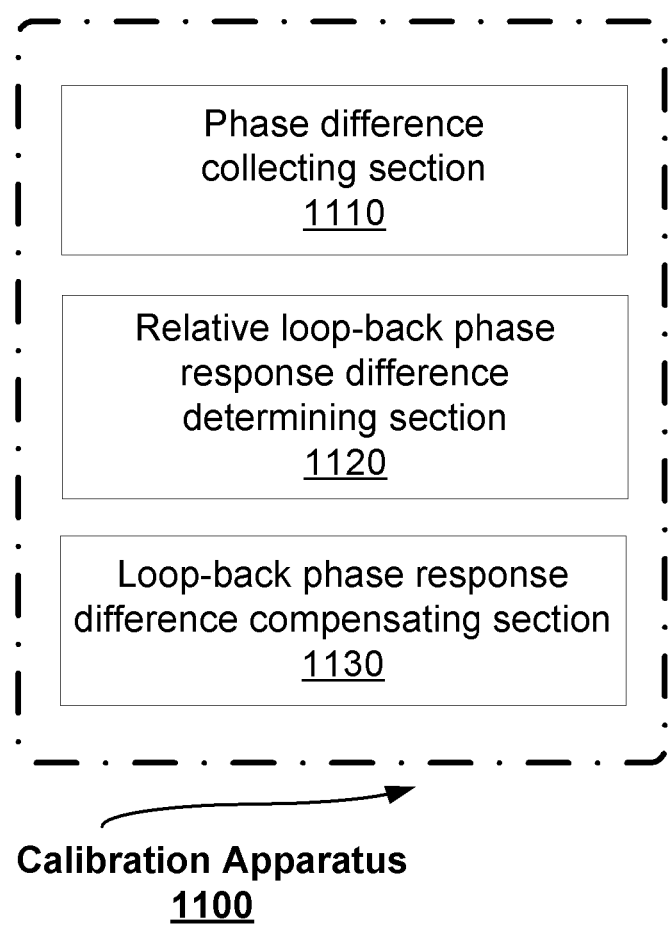
FIG. 11 is a block diagram illustrating an exemplary structure of an apparatus for inner-transceiver antenna calibration according to the present disclosure.

As illustrated in FIG. 11, the apparatus 1100 comprises a phase difference collection section 1110, a relative loop-back phase response difference determining section 1120 and a loop-back phase response difference compensating section 1130. The phase difference collecting section 1100 is configured to collect, for each of the transmission paths, a first phase difference between a first signal and a first reception signal and, for each of the reception paths, a second phase difference between a second signal and a second reception signal. The first signal is transmitted through each of the transmission paths and received through a calibration reception path of the transceiver as the first reception signal. The second signal is transmitted through a calibration transmission path of the transceiver and received through each of the reception paths as the second reception signal. The relative loop-back phase response difference determining section 1120 is configured to determine, for each working path loop consisting of each of the pairs of transmission paths and reception paths, a relative loop-back phase response difference by subtracting the second phase difference from the first phase difference. The relative loop-back phase response difference is a loop-back phase response difference of the working path loop minus a loop-back phase response difference of a calibration path loop consisting of the calibration transmission path and the calibration reception path. The loop-back phase response difference compensating section 1130 is configured to compensate for an inconsistency among the relative loop-back phase response differences of the working path loops.

In an embodiment, the first signal and the second signal may be transmitted on a plurality of subcarriers. The loop-back phase response difference compensating section 1130 may be configured to determine, for each working path loop, a relative loop-back delay difference and a relative loop-back initial phase difference and to compensate for an inconsistency among the relative loop-back delay differences of the working path loops and an inconsistency among the relative loop-back initial phase differences of the working path loops. The relative loop-back delay difference and the relative loop-back initial phase difference are determined for each working path loop by determining, for each subcarrier, a frequency component of the relative loop-back phase response difference of the working path loop and determining, based on the determined frequency components for the plurality of subcarriers, the relative loop-back delay difference and the relative loop-back initial phase difference of the working path loop.

As those skilled in the art will appreciate, the above-described sections may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the RBS where the apparatus for inner-transceiver antenna calibration is implemented comprises a memory and a processor (including but not limited to a microprocessor, a microcontroller or a Digital Signal Processor (DSP), etc.) The memory stores machine-readable program code executable by the processor. The processor, when executing the machine-readable program code, performs the functions of the above-described sections 1110-1130.

As those skilled in the art would appreciate, in practical implementation, the above-described inter-transceiver antenna calibration method 500 may be performed before or after the inner-transceiver antenna calibration method 900.

In the former case, the inconsistency among the relative loop-back phase response differences of the working path loops inside the first transceiver shall be compensated for by aligning the relative loop-back phase response differences of other working path loops with respect to the relative loop-back phase response difference of the first reference path loop, and the inconsistency among the relative loop-back phase response differences of the working path loops inside the second transceiver shall be compensated for by aligning the relative loop-back phase response differences of other working path loops with the relative loop-back phase response difference of the second reference path loop.

In the latter case, the inter-loop phase response difference between the first reference path loop of the first transceiver and the second reference path loop of the second transceiver actually exists between any working path loop of the first transceiver and any working path loop of the second transceiver. Accordingly, not only the inter-loop phase response difference between the first reference path loop of the first transceiver and the second reference path loop of the second transceiver but also the inter-loop phase response difference between any other working path loop of the first transceiver and any other working path loop of the second transceiver shall be compensated for.

Moreover, as already mentioned above, the proposed inter-transceiver antenna calibration method 500 is even applicable to a scenario where each of the transceivers 10 and 20 has a single antenna. In such a scenario, there is no need to perform inner-transceiver antenna calibration at all.

Also, as those skilled in the art would appreciate, the proposed inner-transceiver antenna calibration method 900 may be performed alone for a multi-antenna transceiver in case the transceiver is not involved in CoMP transmission.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method in a Radio Base Station (RBS) for inter-transceiver antenna calibration, the method comprising:

collecting a first phase difference between a first signal and a first reception signal and a second phase difference between a second signal and a second reception signal,
  wherein the first signal is transmitted through a reference transmission path of a first transceiver and received through a reference reception path of a second transceiver as the first reception signal, and
  wherein the second signal is transmitted through a reference transmission path of the second transceiver and received through a reference reception path of the first transceiver as the second reception signal;
determining an inter-loop phase response difference between a first reference path loop of the first transceiver and a second reference path loop of the second transceiver by subtracting the second phase difference from the first phase difference,
  wherein the first reference path loop consists of the reference transmission path and the reference reception path of the first transceiver, and
  wherein the second reference path loop consists of the reference transmission path and the reference reception path of the second transceiver; and
compensating for the inter-loop phase response difference.

2. The method of claim 1, wherein the first signal and the second signal are transmitted on a plurality of subcarriers, and wherein compensating for the inter-loop phase response difference comprises:
  determining, for each subcarrier, a frequency component ($\varphi_k$) of the inter-loop phase response difference;
  determining, based on the determined frequency components for the plurality of subcarriers, an inter-loop delay difference ($\Delta t_{est}$) and an inter-loop initial phase difference ($\varphi_{ini\_est}$) between the first reference path loop of the first transceiver and the second reference path loop of the second transceiver; and
  compensating for the inter-loop delay difference ($\Delta t_{est}$) and the inter-loop initial phase difference ($\varphi_{ini\_est}$).

3. The method of claim 2, wherein the inter-loop delay difference ($\Delta t_{est}$) and the inter-loop initial phase difference ($\varphi_{ini\_est}$) are determined according to one of the following polynomial fitting algorithms:
  standard least squares polynomial fitting,
  weighted least squares polynomial fitting,
  constrained least squares polynomial fitting, and
  robust least squares polynomial fitting.

4. The method of claim 3, wherein, according to the standard least squares polynomial fitting, the inter-loop delay difference ($\Delta t_{est}$) is determined as $$\Delta t_{est} = \frac{L \cdot \sum_{k \in K}(k \cdot \varphi_k) - \sum_{k \in K}\varphi_k \cdot \sum_{k \in K}k}{L \cdot \sum_{k \in K}k^2 - \left(\sum_{k \in K}k\right)^2} * \frac{N}{2\pi},$$

where K denotes a subcarrier set consisting of the plurality of subcarriers on which the first and the second signals are transmitted, L denotes a number of the plurality of subcarriers and N denotes a total number of subcarriers used by the RBS for wireless communications.

5. The method of claim 3, wherein, according to the standard least squares polynomial fitting, the inter-loop initial phase difference ($\varphi_{ini\_est}$) is determined as $$\varphi_{ini\_est} = \frac{\sum_{k \in K}(k \cdot \varphi_k) \cdot \sum_{k \in K} k - \sum_{k \in K} \varphi_k \cdot \sum_{k \in K} k^2}{\left(\sum_{k \in K} k\right)^2 - L \cdot \sum_{k \in K} k^2},$$

where K denotes a subcarrier set consisting of the plurality of subcarriers on which the first and the second signals are transmitted, L denotes a number of the plurality of subcarriers and N denotes a total number of subcarriers used by the RBS for wireless communications.

6. An apparatus for inter-transceiver antenna calibration in a Radio Base Station (RBS) comprising a memory and a processor, wherein the memory stores machine-readable program code that, when executed by the processor, causes the apparatus to:
collect a first phase difference between a first signal and a first reception signal and a second phase difference between a second signal and a second reception signal, wherein the first signal is transmitted through a reference transmission path of a first transceiver and received through a reference reception path of a second transceiver as the first reception signal, and wherein the second signal is transmitted through a reference transmission path of the second transceiver and received through a reference reception path of the first transceiver as the second reception signal;
determine an inter-loop phase response difference between a first reference path loop of the first transceiver and a second reference path loop of the second transceiver by subtracting the second phase difference from the first phase difference,
wherein the first reference path loop consists of the reference transmission path and the reference reception path of the first transceiver, and
wherein the second reference path loop consists of the reference transmission path and the reference reception path of the second transceiver; and
compensate for the inter-loop phase response difference.

7. The apparatus according to claim 6, wherein the first signal and the second signal are transmitted on a plurality of subcarriers, and wherein the apparatus is operative to compensate for the inter-loop phase response difference by:
determining, for each subcarrier, a frequency component ($\varphi_k$) of the inter-loop phase response difference;
determining, based on the determined frequency components for the plurality of subcarriers, an inter-loop delay difference ($\Delta t_{est}$) and an inter-loop initial phase difference ($\varphi_{ini\_est}$) between the first reference path loop of the first transceiver and the second reference path loop of the second transceiver; and
compensating for the inter-loop delay difference ($\Delta t_{est}$) and the inter-loop initial phase difference ($\varphi_{ini\_est}$).

8. The apparatus according to claim 7, wherein the inter-loop delay difference ($\Delta t_{est}$) and the inter-loop initial phase difference ($\varphi_{ini\_est}$) are determined according to one of the following polynomial fitting algorithms:
standard least squares polynomial fitting,
weighted least squares polynomial fitting,
constrained least squares polynomial fitting, and
robust least squares polynomial fitting.

9. The apparatus according to claim 8, wherein, according to the standard least squares polynomial fitting, the inter-loop delay difference ($\Delta t_{est}$) is determined as $$\Delta t_{est} = \frac{L \cdot \sum_{k \in K}(k \cdot \varphi_k) - \sum_{k \in K} \varphi_k \cdot \sum_{k \in K} k}{L \cdot \sum_{k \in K} k^2 - \left(\sum_{k \in K} k\right)^2} * \frac{N}{2\pi},$$

where K denotes a subcarrier set consisting of the plurality of subcarriers on which the first and the second signals are transmitted, L denotes a number of the plurality of subcarriers and N denotes a total number of subcarriers used by the RBS for wireless communications.

10. The apparatus according to claim 8, wherein, according to the standard least squares polynomial fitting, the inter-loop initial phase difference ($\varphi_{ini\_est}$) is determined as $$\varphi_{ini\_est} = \frac{\sum_{k \in K}(k \cdot \varphi_k) \cdot \sum_{k \in K} k - \sum_{k \in K} \varphi_k \cdot \sum_{k \in K} k^2}{\left(\sum_{k \in K} k\right)^2 - L \cdot \sum_{k \in K} k^2},$$

where K denotes a subcarrier set consisting of the plurality of subcarriers on which the first and the second signals are transmitted, L denotes a number of the plurality of subcarriers and N denotes a total number of subcarriers used by the RBS for wireless communications.

11. An apparatus for inner-transceiver antenna calibration in a Radio Base Station (RBS) comprising a memory and a processor, wherein the memory stores machine-readable program code that, when executed by the processor, causes the apparatus to:
collect, for each of one or more transmission paths, a first phase difference between a first signal and a first reception signal and, for each of one or more reception paths, a second phase difference between a second signal and a second reception signal,
wherein the first signal is transmitted through each of the one or more transmission paths and received through a calibration reception path of the transceiver as the first reception signal, and
wherein the second signal is transmitted through a calibration transmission path of the transceiver and received through each of the one or more reception paths as the second reception signal;
determine, for each of one or more working path loops, each working path loop consisting of a corresponding pair of transmission and reception paths, a relative loop-back phase response difference by subtracting the second phase difference from the first phase difference, wherein the relative loop-back phase response difference is a loop-back phase response difference of the working path loop minus a loop-back phase response difference of a calibration path loop consisting of the calibration transmission path and the calibration reception path; and
compensate for an inconsistency among the relative loop-back phase response differences of the one or more working path loops.

12. The apparatus according to claim 11, wherein the first signal and the second signal are transmitted on a plurality of subcarriers, and the apparatus is operative to compensate for the relative loop-back phase response differences among the one or more working path loops by:

determining, for each working path loop, a relative loop-back delay difference and a relative loop-back initial phase difference by:
  for each subcarrier, determining a frequency component of the relative loop-back phase response difference of the working path loop; and
  determining, based on the determined frequency components for the plurality of subcarriers, the relative loop-back delay difference and the relative loop-back initial phase difference of the working path loop; and
compensating for an inconsistency among the relative loop-back delay differences of the one or more working path loops and an inconsistency among the relative loop-back initial phase differences of the one or more working path loops.

\* \* \* \* \*